(12) United States Patent
Schmitt et al.

(10) Patent No.: US 11,833,947 B2
(45) Date of Patent: Dec. 5, 2023

(54) GUIDING DEVICE FOR A SUPPORT BAR AND HEAD RESTRAINT DEVICE WITH GUIDING DEVICE

(71) Applicant: GRAMMER AG, Ursensollen (DE)

(72) Inventors: Sebastian Schmitt, Nuremberg (DE); Steve Kober, Treuen (DE); Gerd Truckenbrodt, Weiden (DE); Markus Gradl, Auerbach (DE); Stefan Bergler, Neumarkt (DE)

(73) Assignee: GRAMMER AG, Ursensollen (DE)

( * ) Notice: Subject to any disclaimer, the term of this patent is extended or adjusted under 35 U.S.C. 154(b) by 16 days.

(21) Appl. No.: 17/873,455

(22) Filed: Jul. 26, 2022

(65) Prior Publication Data

US 2023/0035161 A1 Feb. 2, 2023

(30) Foreign Application Priority Data

Jul. 28, 2021 (DE) ...................... 10 2021 119 620.5

(51) Int. Cl.
| | |
|---|---|
| *B60N 2/897* | (2018.01) |
| *B60N 2/818* | (2018.01) |
| *B60N 2/815* | (2018.01) |
| *B60N 2/821* | (2018.01) |
| *B60N 2/80* | (2018.01) |

(52) U.S. Cl.
CPC ............ *B60N 2/897* (2018.02); *B60N 2/815* (2018.02); *B60N 2/818* (2018.02); *B60N 2/821* (2018.02); *B60N 2002/899* (2018.02)

(58) Field of Classification Search
CPC ... B60N 2/897; B60N 2/818; B60N 2002/899
See application file for complete search history.

(56) References Cited

U.S. PATENT DOCUMENTS

| 9,346,383 B2 | 5/2016 | Martin | |
|---|---|---|---|
| 2005/0200185 A1* | 9/2005 | Yokoyama | ............. B60N 2/818 297/391 |
| 2012/0223563 A1* | 9/2012 | Zimmermann | ........ B60N 2/818 297/391 |

FOREIGN PATENT DOCUMENTS

| DE | 20304945 U1 | 7/2004 |
|---|---|---|
| DE | 102012012867 A1 | 9/2013 |

(Continued)

*Primary Examiner* — David R Dunn
*Assistant Examiner* — Tania Abraham
(74) *Attorney, Agent, or Firm* — LUCAS & MERCANTI, LLP; Klaus P. Stoffel

(57) ABSTRACT

A guide device for a retaining rod of a headrest, having a guide structure forming a channel for guiding and supporting the retaining rod, having a latch device including a latch movable between a latching position and a release position. The latch cooperates with a latch structure of the retaining rod to prevent movement of the retaining rod relative to the guide structure in at least one direction. In the latching position the latch device is engaged with the latch structure of the retaining rod and in the release position the latch is disengaged from the latch structure. The latch device has a locking device movable between a locking position and a disengagement position and has a locking structure which, in the locking position, is in the movement path of the latch to prevent movement from the latching position into the release position and, in a disengagement position, enable movement of the latch into a release position.

16 Claims, 8 Drawing Sheets

(56) References Cited

FOREIGN PATENT DOCUMENTS

DE      102012015810 A1    2/2014
WO    WO2014023843 A1    2/2014

* cited by examiner

Fig. 6
Fig. 7
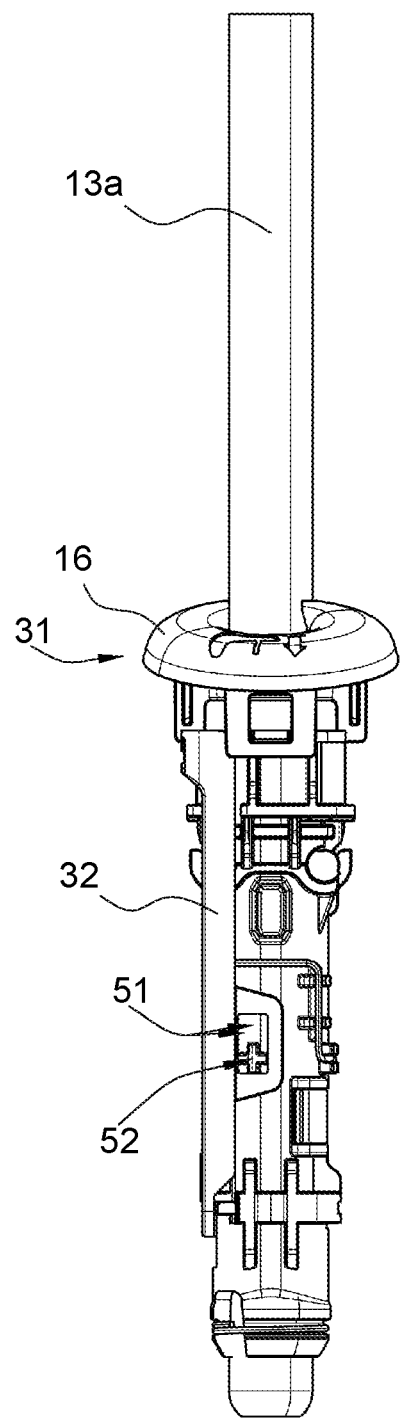
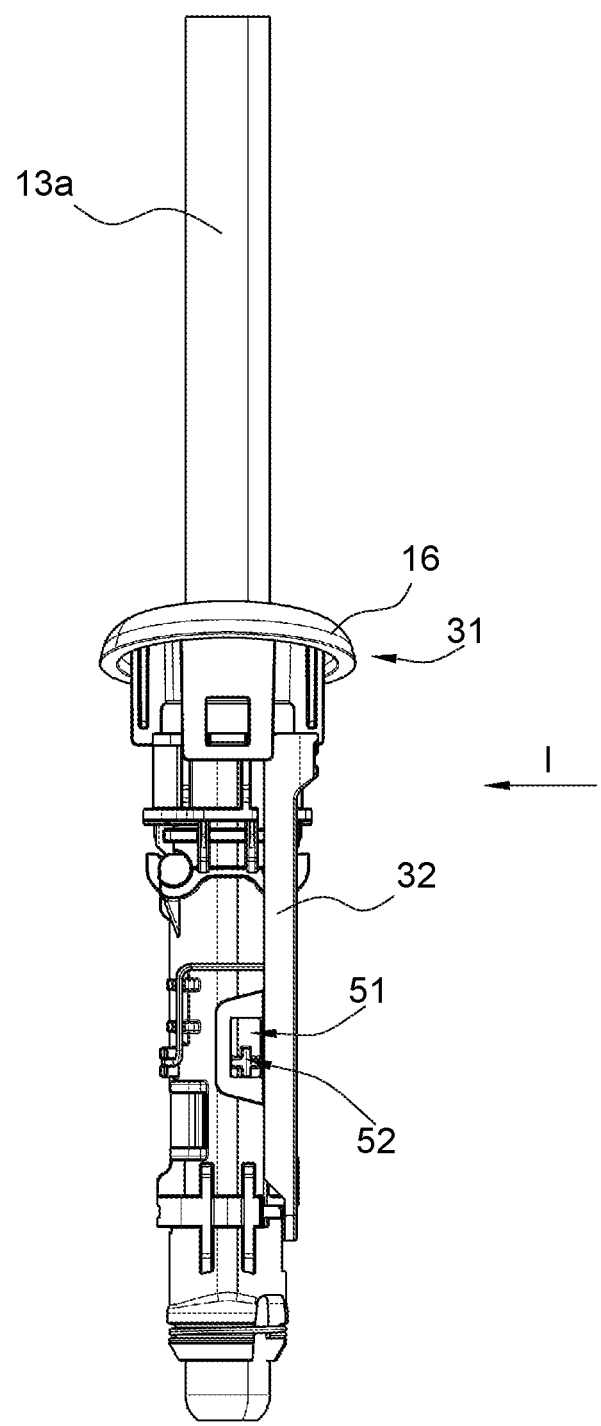

Fig.13
Fig.14
Fig.15
Fig.16
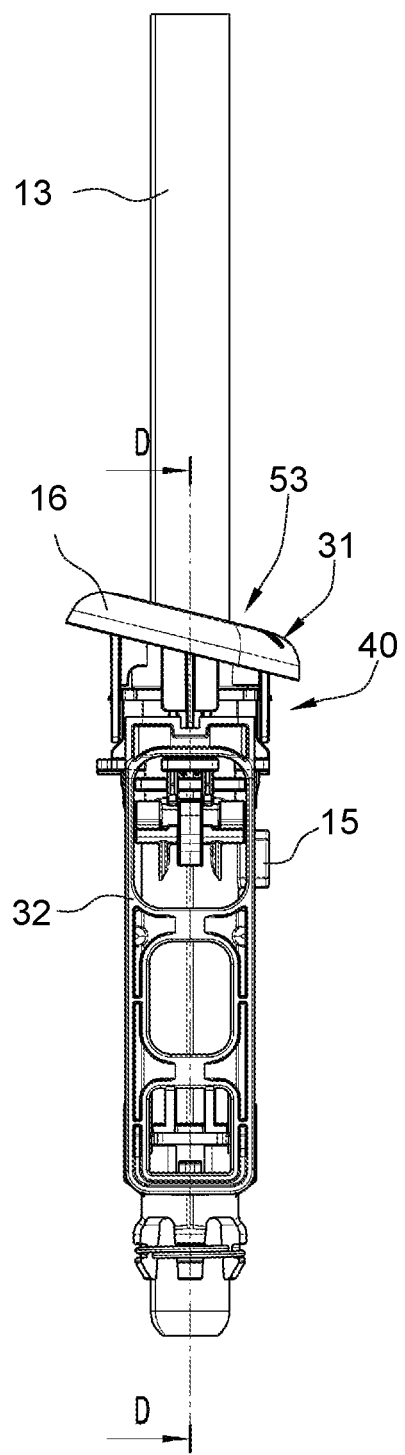
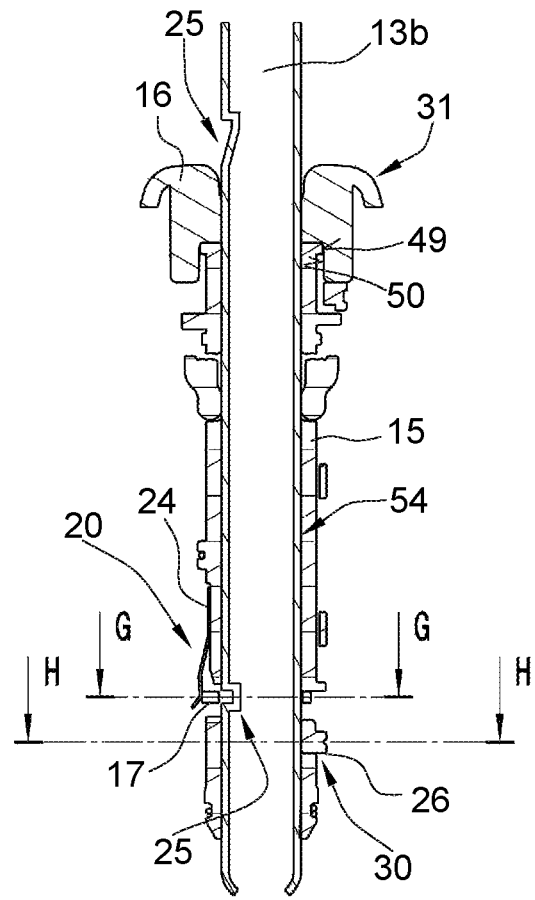
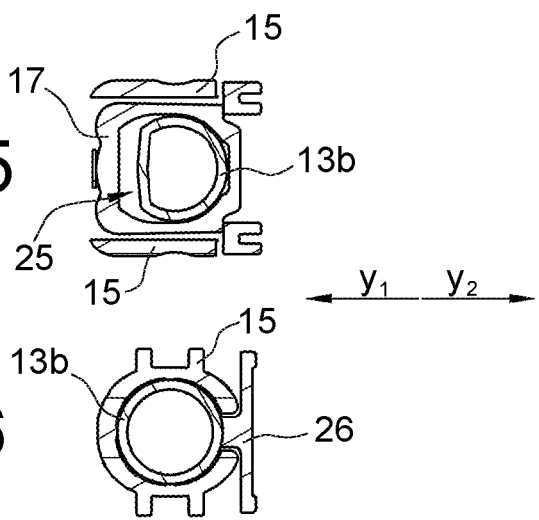
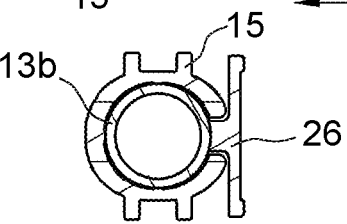

Fig. 19
Fig. 20
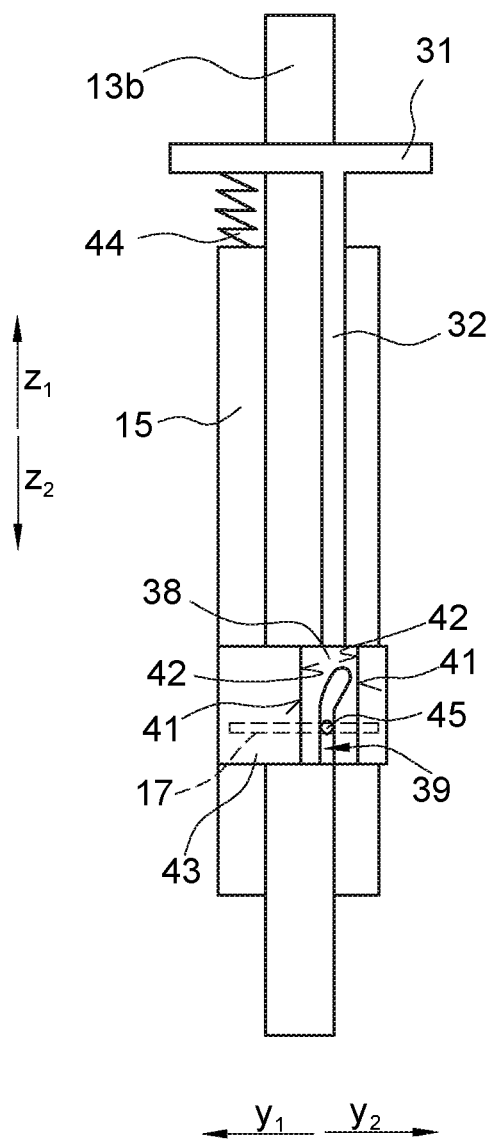
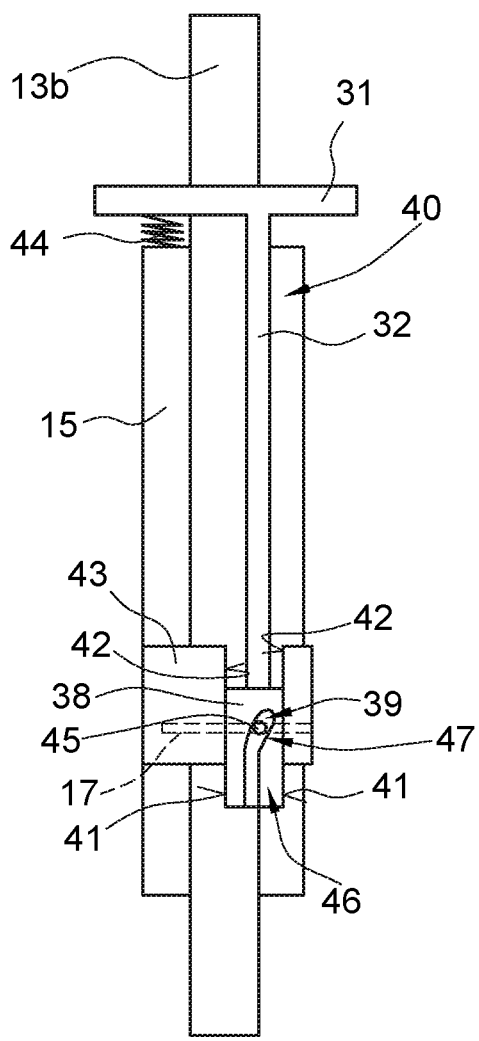

GUIDING DEVICE FOR A SUPPORT BAR AND HEAD RESTRAINT DEVICE WITH GUIDING DEVICE

CROSS-REFERENCE TO RELATED APPLICATIONS

The present application which claims priority of DE 10 2021 119 620.5, filed Jul. 28, 2021, the priority of the application is hereby claimed and this application is incorporated herein by reference.

BACKGROUND OF THE INVENTION

The invention initially relates to a guide device.

Such a guide device is known from obvious prior use. The guide device has a channel for receiving a retaining rod. By means of a latch device comprising a latch in the form of a cassette-like slider with a latching area arranged thereon, it is possible to adjust between a latching position and a release position. In the latching position, the latch is arranged to move into engagement with one of the latch notches on the retaining rod. In the release position, the latch is disengaged from the latch notches. The latch is loaded by a spring into the release position.

In the event of an unfavorable force constellation acting on the guide device, the latch can move unintentionally from the latching position in the direction of the release position. This may be the case, for example, in the event of an accident, due to strong acceleration forces.

A retaining rod of a headrest mounted in the guide device can then no longer fulfill its safety function. The guide device therefore appeared to be in need of improvement with regard to the latch device.

SUMMARY OF THE INVENTION

It was the object of the invention to provide a guide device that is improved with respect to its latch device. In particular, such an unintentional movement into the release position should be prevented.

The guide device is provided to guide a retaining rod of a headrest. It comprises a guide structure. This can be configured as a sleeve, for example, or alternatively have individual guide support abutment means, for example, and in this way form a guide channel suitable for guiding and supporting the retaining rod.

A latch device of the guide device comprises at least one latch movable between a latching position and a release position. The latch is configured to cooperate with a latch structure of the retaining rod. At least one latch structure is formed on the retaining rod. The at least one latch and latch structure may be any structure suitable for preventing movement of the retaining rod in at least one direction.

For example, the latch structure is a structure of the retaining rod, having at least one latch surface arranged approximately in a right angle to the movement direction of the retaining rod. The latch comprises, for example, a latch wire or at least one surface adapted to cooperate with the latch structure such that relative movement of the retaining rod relative to the guide structure can be prevented.

In the latching position of the latch device, the latch is arranged to be in engagement with the latch structure of the retaining rod and in the release position, the latch is arranged to be in disengagement from the latch structure.

The latch device has a locking device movable between a locking position and a disengagement position and having a locking structure which, in the locking position, is arranged in the movement path of the latch in such a way that movement out of engagement with the latch structure in the direction of the release position is not possible. In a disengagement position, the locking means are moved out of the movement path. The latch can then be moved into the release position or is already in the release position.

The advantage of the feature combination according to the invention is, among other things, that the latch device cannot move unintentionally into the release position. The latch cannot be moved out of engagement with the countermeasures against the spring force due to forces acting in the event of an accident, for example. The reliability of the latching and thus the safety of the guide part has thus been significantly improved.

The latch comprises a carrier area, for example. In the context of the invention, a carrier area means that the latch has a latching area, for example, and a carrier area. For example, an assembly forms the latch and at the same time comprises bearing and possibly guide means for the latch. The carrier area can be a pivoting or translationally displaceable unit, in particular a part, which supports the latch. The latch is fastened to the carrier, for example. Alternatively, the latch is formed on the carrier. The latch is formed in one piece with the latch, for example.

The carrier area comprises first guide means, for example, which cooperate with second guide means of the guide structure to move the latch between the latching position and the release position. The latch is guided by the second guide means in a drawer-like manner, for example.

The locking structure cooperates with the latch as well as with an abutment structure, wherein the abutment structure forms an abutment for the forces acting on the locking structure which are directed in the release direction of the latch. The locking structure is in the latching position of the latch device in the movement path of the latch. A first surface of the locking structure cooperates with the latch, for example, and a second surface of the locking structure cooperates with the abutment structure, for example.

The at least one latch is associated with a pivoting element, for example. For example, an element comprising the latch is held pivotably on the guide structure. Alternatively, an elastic element with a free latching area is held on the guide structure, for example, wherein the free latching area forms the latch. Alternatively, the latch can also be fastened to the free latching area.

The latch can alternatively be associated with a translationally displaceable element, for example. For example, the latch is formed or fastened on a slider. Also, a deformable element, for example, which supports or forms the latch can be movably guided on a path between two positions.

The latch device comprises an actuating device, for example, movable between an unactuated position and an actuated position, by means of which actuating device the latch device can be adjusted between the latching position and the release position. For example, at least one spring element is provided, which loads the locking device back into the locking position. Insofar as there is a motion coupling between the latch device and the actuating device, the actuating device can also have a spring element which loads the actuating device into the unactuated position and loads the latch device into the release position. The latch device is then automatically returned to the latching position.

The locking structure can be arranged, for example, between an outer surface of the latch and a surface of a receptacle of the vehicle structure. The guide device is usually fastened in a receptacle of the vehicle structure, in particular the seat structure. This receptacle provides a surface which can form the abutment structure for the locking structure.

The locking structure is arranged, for example, between an outer surface of the latch and the guide structure. In this case, the abutment structure is formed by the guide structure. When a force is applied to the latch in the direction of the release position, a surface of the guide part prevents the locking structure from moving in the movement direction of the latch.

For example, the locking structure can be formed by a slotted link part with a slotted link, wherein a pin of the latch engages in the slotted link and is guided by a reveal of the slotted link in such a way that, in the latching position, an undesired movement of the latch out of the set position is prevented. A central axis of an area of the slotted link in which a pin of the latch is arranged in the latching position extends at right angles to the movement direction of the latch, for example. In this way, the forces which load the latch in the direction of the release position can be absorbed by the reveal of the slotted link. The slotted link is guided, for example, by guide structures which also form an abutment that prevents the slotted link from moving in the movement direction of the latch.

For example, the locking structure is associated with an adjustment part. The adjustment part, which is part of an adjustment device, can be used to move the locking structure between the locking position and the disengagement position, for example. The adjustment device can be configured separately from the actuating device and, for example, can be motion-connected to it in such a way that the locking structure is moved into the disengagement position and the latch is moved into the release position simultaneously or successively. In certain cases, it is necessary to first adjust the locking structure to the disengagement position and then move the latches to the release position. In the case of a motion coupling; for example, when the actuating device is actuated, the adjustment device is moved into the disengagement position at the same time or in advance. The motion coupling takes place by means of a connection, for example, between the actuating device and the adjustment device or with the formation of catch elements.

According to an alternative embodiment, the actuating device at the same time forms the adjustment device.

For example, the actuating device comprises an actuating part which is configured as a carriage. The carriage can for example be guided parallel to the longitudinal axis of the retaining rod. For example, the carriage is guided on the guide structure.

For example, the actuating part can be moved approximately at right angles to the movement direction of the latches.

The latch is for example configured as a ring, and has a recess which can be penetrated by a retaining rod. The ring can be completely closed, for example, or alternatively be formed only in a U-shape over an area. The outer surface of the latch has a rectangular shape, for example. Thus, an advantageous guiding of the carrier is possible. For example, the latch is arranged on a reveal of the recess. For example, the latch is formed by the reveal of the recess of the carrier. The recess is configured in such a way, for example, that a movement of the carrier between the latching position and the release position is possible.

For example, the recess is configured as a slot.

The locking structure can be moved into the recess, for example, and cooperates with an outer surface of the retaining rod and with a reveal of the recess. If the locking structure is arranged in the recess, the locking device is in the locking position. If the locking structure is moved out of the recess, the locking device is arranged in the disengaged position. The movement of the locking structure takes places at right angles, for example, to the movement direction of the latch.

According to a second aspect, the invention relates to a headrest device.

Such a headrest device is known from the prior art already mentioned above. Reference is made to the explanations on the above-mentioned prior art.

It was the object of the invention to provide a headrest device which, with regard to its guide device, has a higher level of safety in terms of preventing unintentional unlocking.

The headrest device according to the invention comprises a headrest with a head part, which forms a head support surface and a retaining device with at least one retaining rod for supporting the head part. The retaining rod can be configured as a bracket. Alternatively, however, one or two individual retaining rods can also be comprised by the retaining device.

The retaining rod is mounted in a guide device. The guide device is mounted on the vehicle structure, in particular on a seat structure of a vehicle seat. Within the meaning of the invention, a vehicle seat means a seat of a land vehicle, aircraft or watercraft. The guide device is configured according to the first aspect of the invention. To avoid repetition, reference is made to the explanations regarding the first aspect of the invention with respect to the advantages.

Exemplary embodiments of the invention are described by way of example in the following description of the figures and with reference to the schematic drawings. For the sake of clarity, identical or comparable parts or elements or areas are designated with the same reference characters, sometimes with the addition of small letters, even where different exemplary embodiments are concerned.

Features described, illustrated or disclosed with respect to only one exemplary embodiment may be provided within the scope of the invention with respect to any other exemplary embodiment of the invention. Such amended embodiments—even if not shown in the drawings—are within the scope of the invention.

All disclosed features are essential to the invention per se. The disclosure of the application hereby also includes the disclosure content of the cited publications and the described prior art devices in their entirety, also for the purpose of including individual or several features of the subject matters disclosed therein in one or several claims of the present application. Such amended embodiments—even if not shown in the drawings—are also within the scope of the invention.

BRIEF DESCRIPTION OF THE DRAWING

The Figures Show in:

FIG. 6 a view of the headrest device from a first side, wherein the head part is not shown, FIG. 7 a view of the headrest device from a second side opposite the first side, wherein the head support part is not shown, FIG. 8 a view along the view arrow I in FIG. 7, FIG. 9 a sectional view along the sectional line C-C in FIG. 8, FIG. 10 a sectional view along the sectional line F-F in FIG. 9, FIG. 11 a headrest device in the style of FIG. 6, wherein the actuating device is in an actuated position, FIG. 12 a headrest device in the style of FIG. 7, wherein the actuating device is in an unactuated position, FIG. 13 a view along the view arrow J in FIG. 12, FIG. 14 a sectional view along the sectional line D-D in FIG. 13, FIG. 15 a sectional view along the sectional line G-G in FIG. 14, FIG. 16 a sectional view along the sectional line H-H in FIG. 14, FIG. 17 a sectional view of a second exemplary embodiment in the style of FIG. 10, FIG. 18 a sectional view of a third exemplary embodiment in the style of FIG. 10, FIG. 19 a side view of the headrest device according to a fourth exemplary embodiment, wherein the head part is not shown and the latch device is arranged in the latching position, FIG. 20 a side view of the headrest device according to a fourth exemplary embodiment, wherein the head part is not shown and the latch device is arranged in the release position.

DETAILED DESCRIPTION OF THE INVENTION

Figure 1:
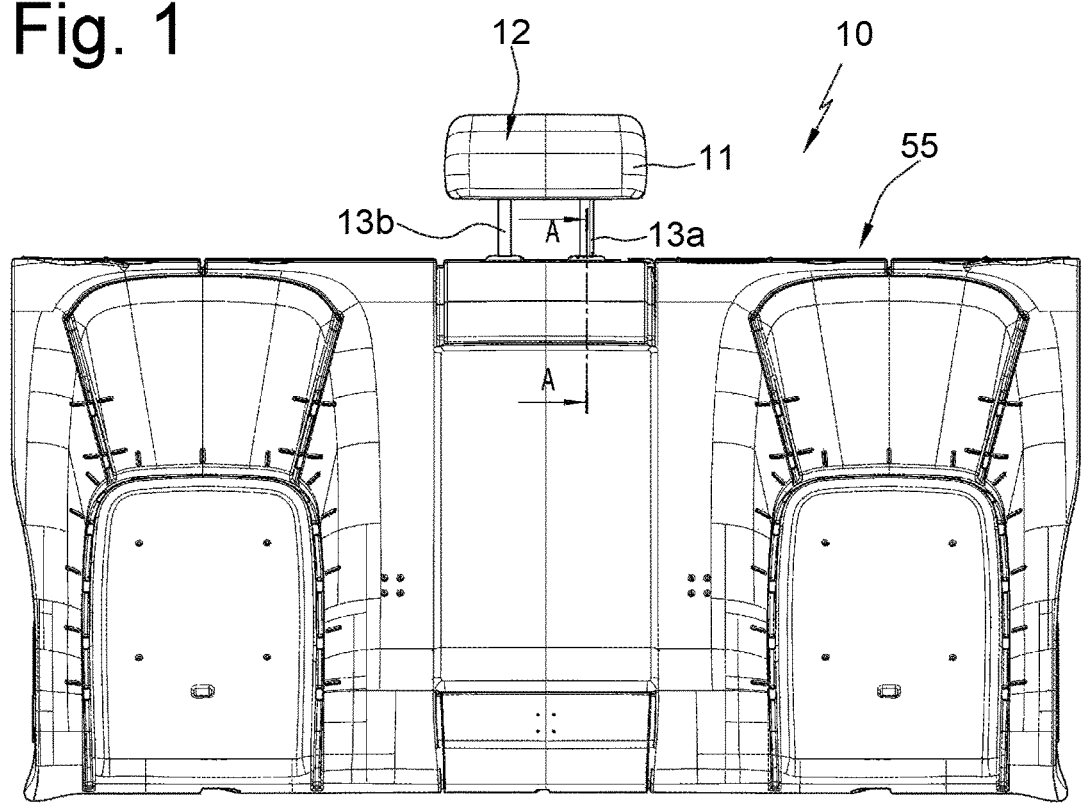
FIG. 1 a headrest device on a backrest of a vehicle seat.
Figure 2:
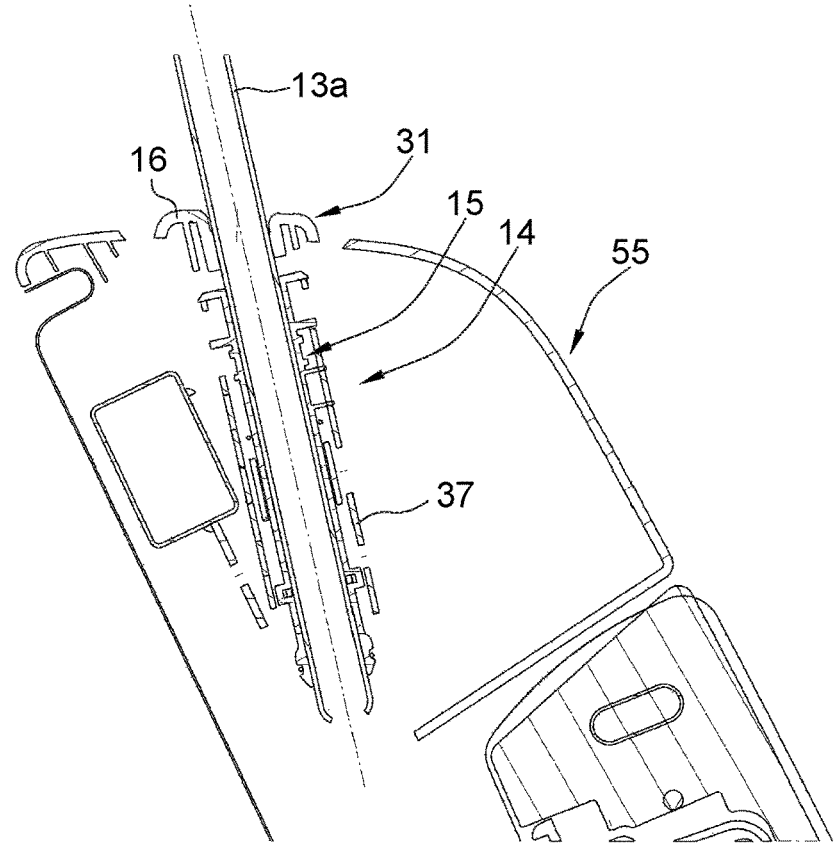
FIG. 2 a sectional view along the sectional line A-A in FIG. 1.
Figure 3:
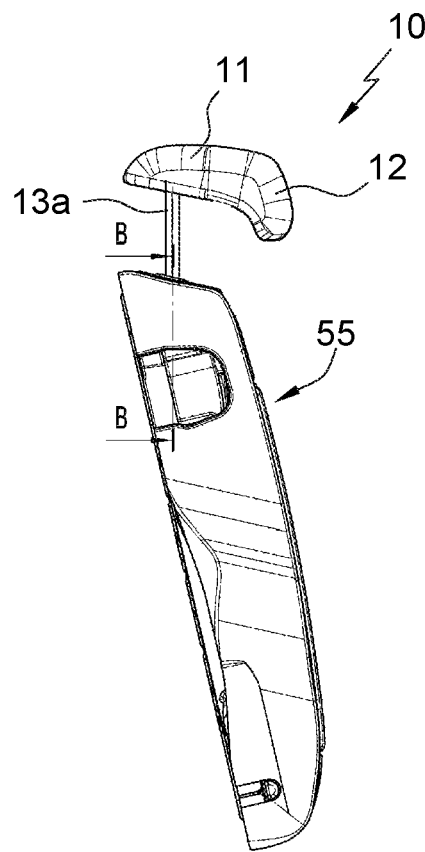
FIG. 3 a side view of the backrest with the headrest device.

A headrest device as a whole is denoted with reference numeral 10 in the figures.

The headrest device 10 according to FIGS. 1 to 4 comprises a headrest 11 having a head part 12 and having retaining rods 13a and 13b. The retaining rods 13a and 13b can be individual retaining rods or free ends of a retaining rod bracket. The retaining rods 13a and 13b are mounted in guide devices 14 and can be latched in a set position with a latch device 20. According to FIGS. 1 and 2, the headrest device 10 is mounted on the backrest 55 of a vehicle seat.

As both retaining rods 13a and 13b are mounted in the same way, in the following only the mounting and latching of the retaining rod 13b is described.

Figure 4:
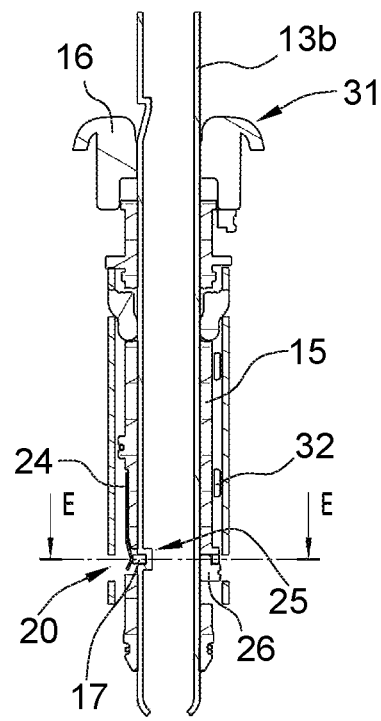
FIG. 4 a sectional view along the sectional line B-B in FIG. 3.
Figure 5:
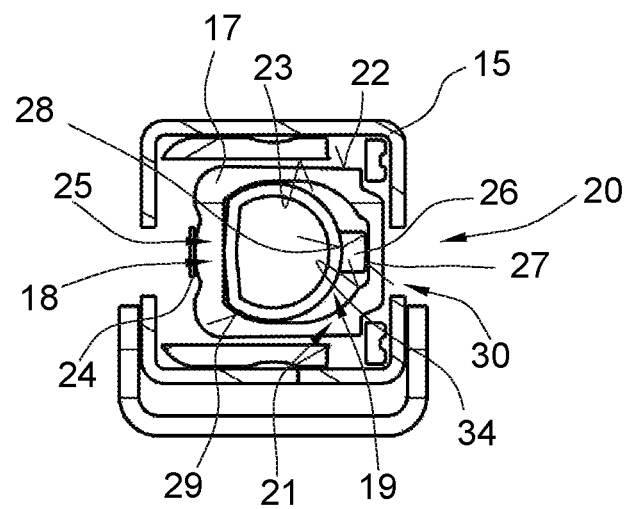
FIG. 5 a sectional view along the sectional line E-E in FIG. 4.

According to FIGS. 4 and 5, the latch device 20 comprises a latch 17. In this exemplary embodiment, the latch 17 comprises the latching area 18 and a carrier area 21. The latch 17 has a recess 19. The latch 17 also has guide surfaces 22 which slidably cooperate with mating surfaces 23 to move the latch 21 between the latching position according to FIG. 5 and the release position according to FIG. 15. The mating surfaces 23 are formed on a guide structure 15 of the guide device 14. A spring 24 loads the latch 17 into the latching position.

In the latching position (see e.g., FIGS. 5, 9 and 10), the retaining rod 13b cannot be moved with respect to the directions z1 and z2. The latch 17 is in engagement with a latch structure 25 of the retaining rod, which has opposing latch surfaces 33 extending in a right angle to the movement directions z1 and z2. In the release position, the latch 17 is disengaged from the latch structure 25. The retaining rod 13a can be moved in the directions z1 and z2.

A locking device 30 comprises a locking element 26 (see FIG. 9) movable between a locking position and a disengagement position. In the locking position of the locking device 30, the locking element 26 is arranged in the movement path of the latch 17 such that a movement of the latch 17 out of the latching position in the direction y1 into the release position is not possible. With a first surface 27, the locking element 26 is in contact with an outer surface 34 of a reveal of the recess 19 of the latch 17, and with a second surface 28, which is arranged opposite the first surface 27, the locking element 26 is in contact with an outer surface 29 of the retaining rod 13b, which forms an abutment structure for the locking element 26. The latch 17 can thus not be moved out of the latching position if forces act on the latch 17 loading the latch 17 into the release position.

The locking device 30 is motion-connected to the latch device 20 in such a way that the locking device 30 is arranged in the locking position when the latch device 20 is in the latching position and that the locking device 30 is arranged in the disengagement position when the latch device 20 is in the release position.

The movement connection is staggered, for example, so that when the latch device 20 is moved to the release position, the locking structure 26 is first moved to the disengaged position and then the latch 17 is moved out of engagement with the mating means to the release position.

The latch device 20 comprises an actuating device 40 to move the latch device 20 between the latching position and the release position. The actuating device 40 has a control element 31, by means of which the actuating device 40 can be adjusted by a user. In the present exemplary embodiment, the control element 31 is the upholstery panel 16 of the guide device 14. Alternatively, however, it would also be possible to provide a separate control element 31 on the guide device 14.

The upholstery panel 16 comprises a recess 48 with a sliding surface 50 which is in contact with a guide surface 49 of the guide structure 15. In this way, the upholstery panel 16 can be moved between the unactuated position shown in FIG. 9 and an actuated position shown in FIG. 14.

The actuating device 40 also has an actuating element 32 (see FIGS. 6 to 8) which actuates the locking device 30 and the latch device 20 when the actuating element 31 is actuated. Alternatively, it would also be possible to provide separate actuating elements to actuate the locking device 30 and the latch device 20. The upholstery panel 16 is connected to the actuating element 32, so that when the upholstery panel 16 is displaced in the direction z2, the actuating element 32 is also displaced in the direction z2. As the locking structure 26 is held on the actuating element 32, the locking structure 26 is also moved in the direction z2.

Figure 8:
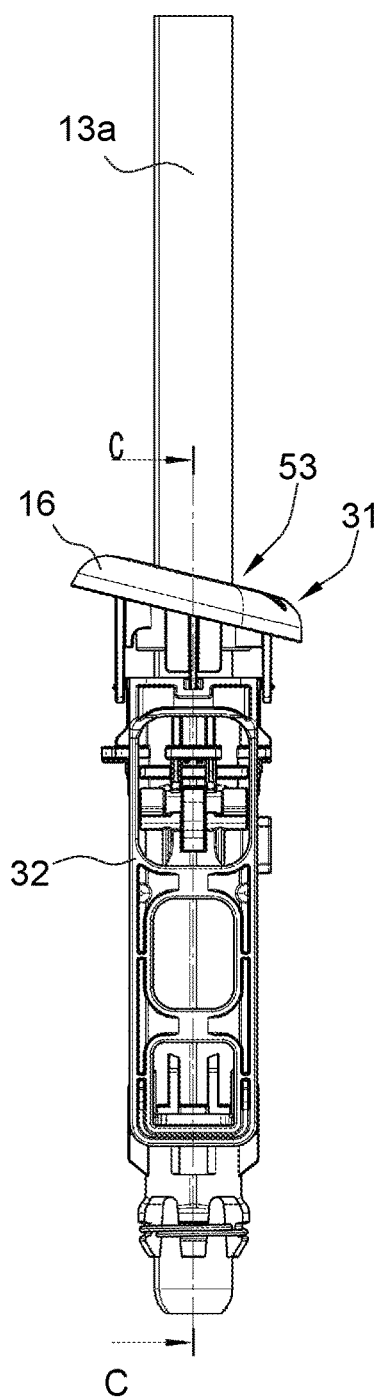

In the present exemplary embodiment, the actuating element 32 is configured as a plate-shaped slider, which can be clearly seen in FIGS. 6 to 8, for example. The actuating element 32 can be moved in the directions z1 and z2. The actuating element comprises structures with a slot 51 on opposite sides, in which a projection 52 of the guide structure 15 engages, in order to limit in this way the movement of the actuating element 32 in the directions z1 and z2.

Figure 9:
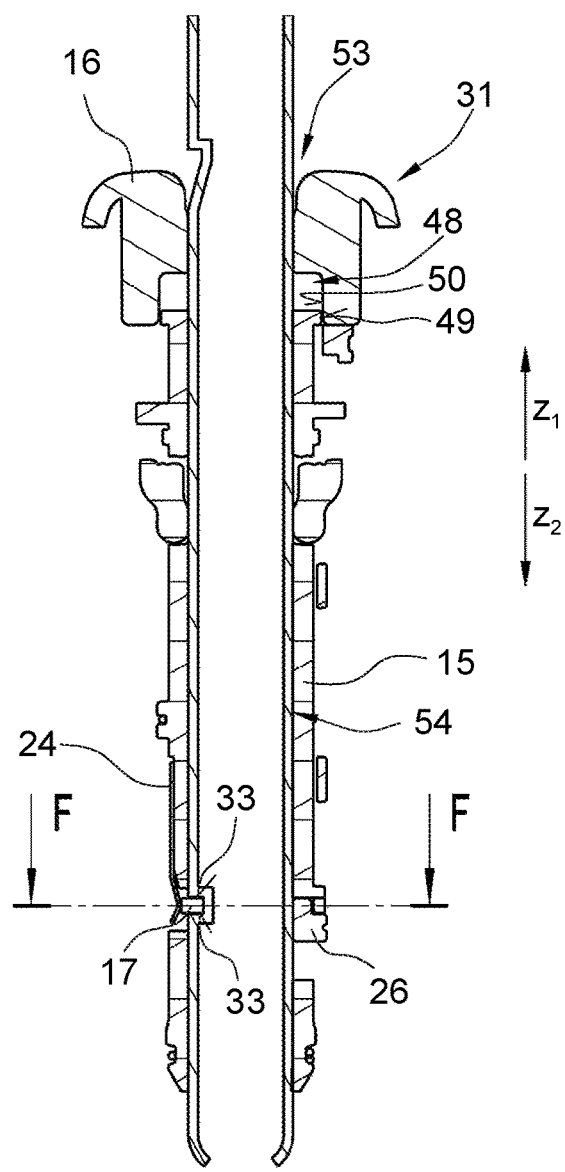

According to FIGS. 8 and 9, the latch device is in the latching position. The latch 17 is in engagement with the latch structure 25. The locking device 30 is arranged in the locking position, wherein the locking structure 26 is positioned in the movement path of the latch 17, movable in the directions y1 and y2.

Figure 10:
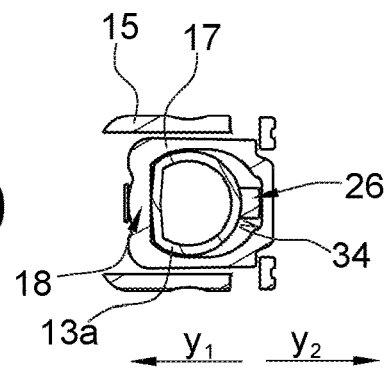
Figure 11:
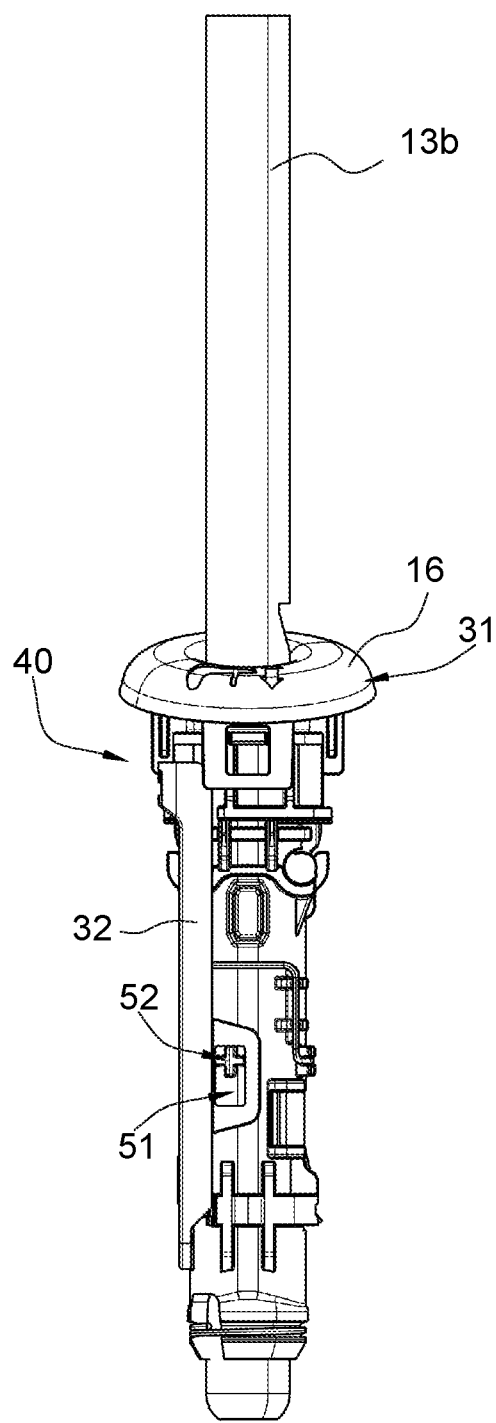
Figure 12:
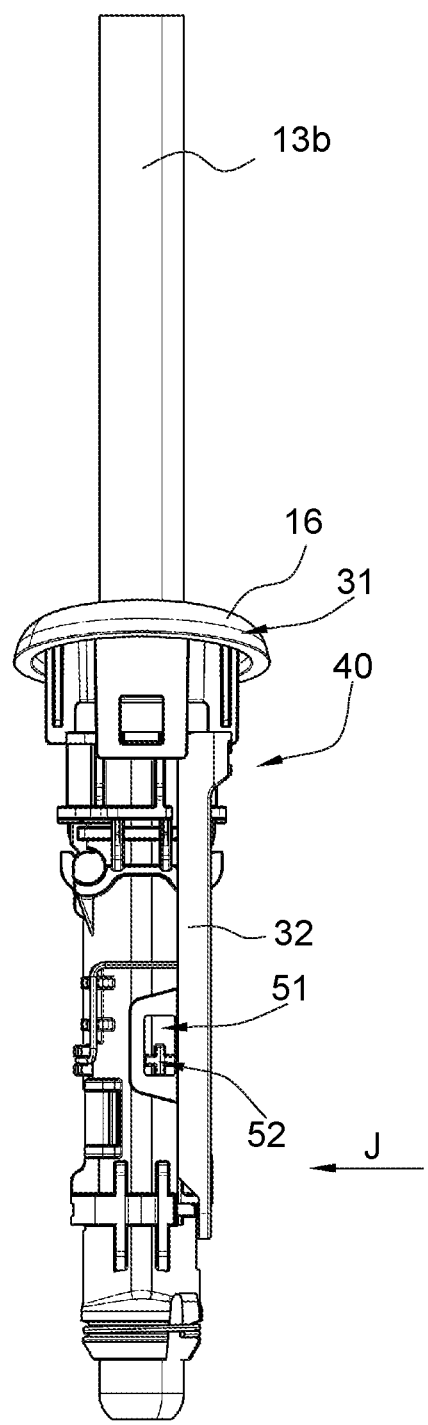

According to FIG. 10, it can be seen that the latch 17 cannot unintentionally move in the direction y1 into the release position when the locking device 30 is in the locking position.

If the control element 31 is now actuated in the direction z2, the actuating element 32 is also displaced in the direction z2. The actuating element 32 is connected to the locking element 26 and displaces the locking element 26 in the direction z2 out of the movement path of the latch 17. Offset in the direction z1, actuating structures are formed on the actuating element 32 (not shown) which, after the locking device 30 is in the disengaged position, move the latch 17 against the spring force of the spring 24 by means of cooperating inclined surfaces in the direction y1 out of engagement with the latch structure 25 (see FIGS. 14 to 16). The retaining rod 13b can then be removed from the guide structure 15.

The retaining rod 13b can be mounted by inserting the retaining rod 13b through an opening 53 of the upholstery panel 16 into a guide channel 54 of the guide structure 15. The control element 31 is actuated such that the locking device 20 is moved into the release position and the locking device 30 is moved into the disengagement position. Once the latch structure 25 of the retaining rod 13b is at the same z-position as the latch 17, it can move into engagement with the latch structure 25 of the retaining rod 13b after the control element 31 is released from the spring 24. The control element 31 is loaded in the direction z1 by a spring (not shown). It is therefore moved in the direction z1 after being unloaded, thereby also moving the actuating element 32 in the direction z1. In this case, the locking device 30 moves into the locking position again.

Figure 17:
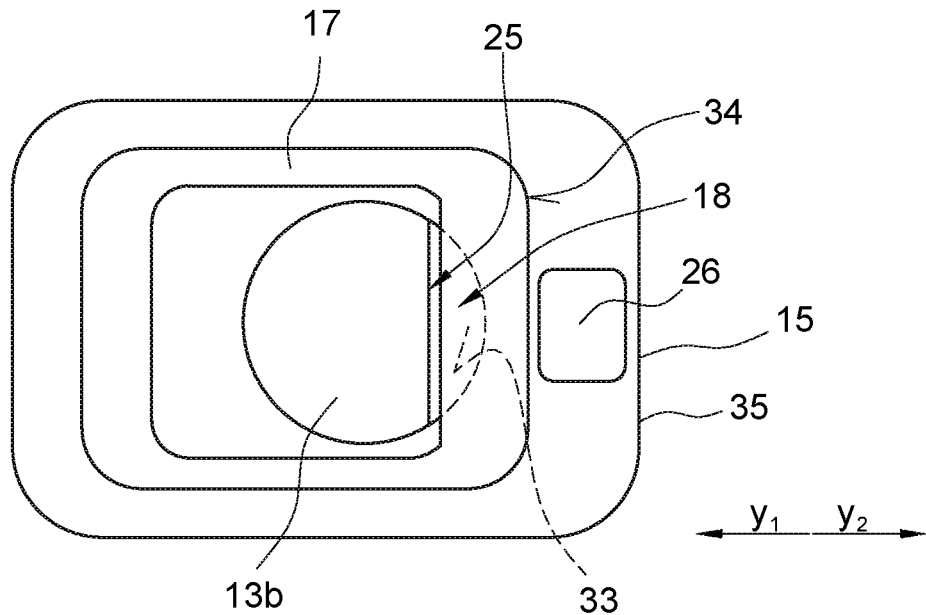

FIG. 17 shows, in the style of FIG. 10, a second exemplary embodiment, which differs from the first exemplary embodiment only in that the first surface 27 of the locking element 26 is in contact with an outer surface 34 of the latch 17 in the locking position and the oppositely arranged second surface 28 is in contact with a wall 35 of the guide structure 15, which forms the abutment structure. In addition, the actuating element 32 must perform a pulling motion to displace the latch 17 from the latching position into the release position, which can also be carried out via cooperating inclined surfaces of the actuating element 32 and the latch 17.

Figure 18:
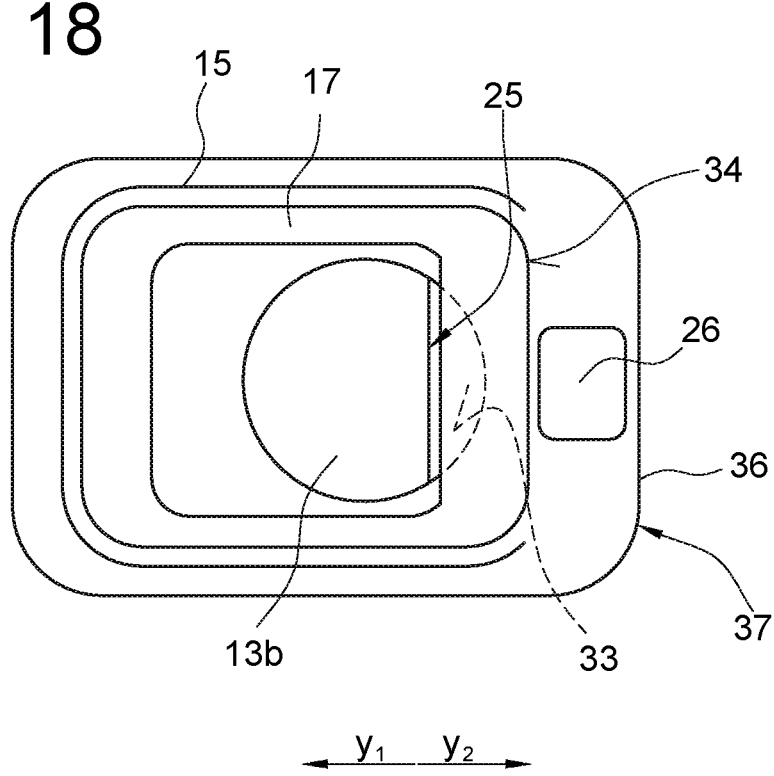

FIG. 18 shows a third exemplary embodiment. This differs from the exemplary embodiment according to FIG. 17 in that in the locking position a first surface 27 of the locking element 26 is in contact with an outer surface 34 of the latch 17 and an oppositely arranged second surface 28 is in contact with a wall 36 of a receptacle 37 of the seat structure.

A fourth exemplary embodiment is shown in FIGS. 19 and 20. Via the operating element 31 as well as the actuating element 32, a slotted link part 38 can be moved in the direction z1 and z2 with a slotted link 39. The slotted link part 38 has bearing surfaces 41 which are in engagement with guide surfaces 42 on an abutment structure 43 arranged on the guide structure 15. The slotted link part 38 thus only has degrees of freedom in the directions z1 and z2. The movement unit, made up of the control element 31, actuating element 32 and slotted link part 38, is loaded by a spring 44 in the direction z1 into the unactuated position.

A pin 45, which engages in the slotted link 39, is connected to the latch 17. When the pin 45 is in the latch position in a lower area 46 (see FIG. 19) of the slotted link 39, the latch 17 is arranged to engage the latch structure 25 of the retaining rod 13b. The lower area 46 is oriented approximately parallel to the z-axis. In this position of the slotted link part 38, a movement of the latch 17 in the direction y2 is not possible because the reveal of the slotted link 39 prevents a movement of the pin 45 in the direction y2. The slotted link part 38 transmits forces acting in the direction y1 to the guide surface 42 of the abutment structure 43.

When the pin 45 is in the upper area 47 according to FIG. 20, the latch 17 is moved out of engagement with the latching structure 25. The longitudinal axis of the slotted link 39 forms an angle≠0 with the Z-axis in the upper area 47.

In all four exemplary embodiments, the movement direction of the latch 17 is different to the movement direction of the locking element 26. In this case, a right angle is formed between the movement directions of the latch 17 and the locking element 26. Alternatively, the movement directions could be different from one another.

The invention claimed is:

1. A guide device for a retaining rod of a headrest, comprising: a guide structure that forms a channel for guiding and supporting the retaining rod; and a latch device having a latch movable between a latching position and a release position, the latch being configured to cooperate with a latch structure of the retaining rod to prevent movement of the retaining rod relative to the guide structure in at least one direction, wherein in the latching position of the latch device, the latch is in engagement with the latch structure of the retaining rod mounted in the guide structure and in the release position the latch is arranged to be disengaged from the latch structure, wherein the latch device further includes a locking device movable between a locking position and a disengagement position and having a locking structure which, in the locking position, is arranged in a movement path of the latch so as to prevent movement from the latching position into the release position and, in a disengagement position, enable movement of the latch into a release position.

2. The guide device according to claim 1, wherein the latch has a latching area and a carrier area.

3. The guide device according to claim 1, wherein the locking structure is arranged to cooperate with the latch and with an abutment structure.

4. The guide device according to claim 3, wherein the locking structure is arranged between an outer surface of the latch and the guide structure, which forms the abutment structure.

5. The guide device according to claim 1, further comprising an actuating device operative to adjust the latch between the latching position and the release position.

6. The guide device according to claim 1, wherein the latch is configured as a pivoting lever or as a translationally displaceable element.

7. The guide device according to claim 1, wherein the locking structure and the latch are guided on movement paths that form a non-zero angle to one another.

8. The guide device according to claim 7, wherein the movement paths are at right angles to one another.

9. The guide device according to claim 1, wherein, for fastening the guide structure to a seat structure, the locking structure is arrangeable with an outer surface of the latch and an abutment structure formed as a receptacle.

10. The guide device according to claim 1, wherein the locking structure is formed by a slotted link part with a slotted link, the latch having a pain that engages in the slotted link and is guided by a reveal of the slotted link so that, in the latching position, movement of the latch out of the latching position is not possible.

11. The guide device according to claim 1, further comprising an actuating device operative to adjust the latch device between the latching position and the release position.

12. The guide device according to claim 11, wherein the actuating device includes means for adjusting the locking device between the locking position and the disengagement position.

13. The guide device according to claim 11, wherein the actuating device comprises an actuating part configured as a carriage.

14. The guide device according to claim 1, wherein the latch is configured as a ring and comprises a recess which can be penetrated by the retaining rod.

15. The guide device according to claim 14, wherein the locking structure is arranged in the recess in the locking position and cooperates with an outer surface of the retaining rod and with a reveal of the recess.

16. A headrest device, comprising: a headrest having a head part and a retaining device having at least one retaining rod; and, a guide device according to claim 1, wherein the retaining rod is mounted in the guide device.

* * * * *